No. 722,173. PATENTED MAR. 3, 1903.
S. A. BROWN.
WEIGHING AND COMPUTING SCALE.
APPLICATION FILED MAR. 6, 1902.
NO MODEL. 5 SHEETS—SHEET 1.
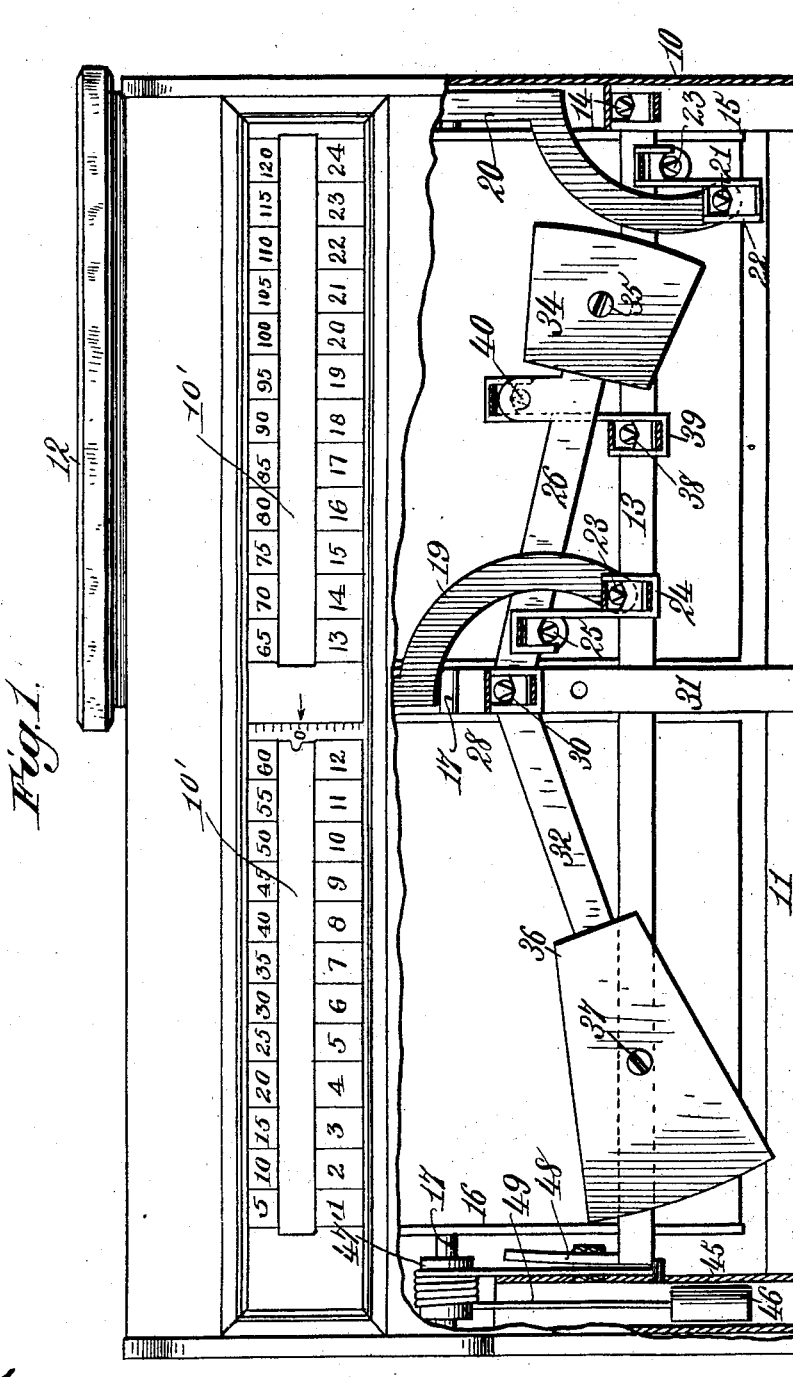
Witnesses. Inventor.
Stuart A. Brown,
By James L. Norris,
Atty.

No. 722,173. PATENTED MAR. 3, 1903.
S. A. BROWN.
WEIGHING AND COMPUTING SCALE.
APPLICATION FILED MAR. 6, 1902.
NO MODEL. 5 SHEETS—SHEET 2.
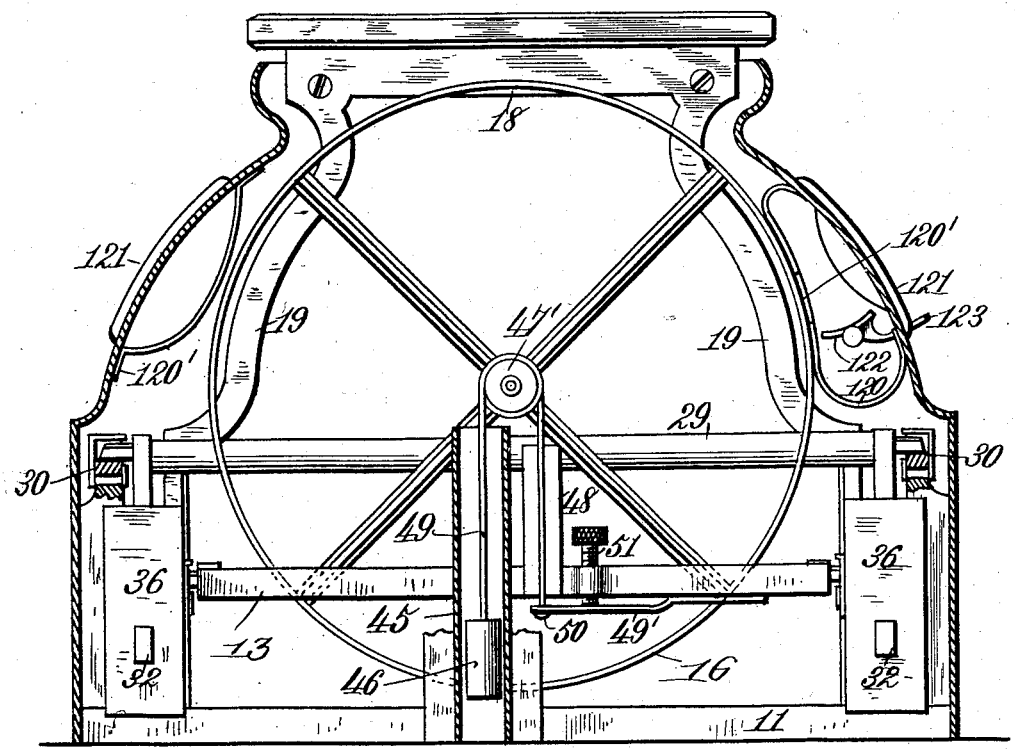
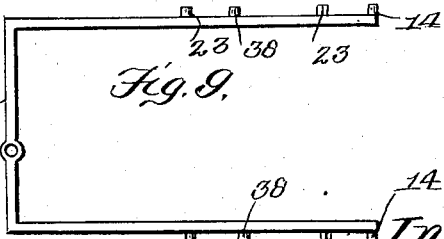
Witnesses.
Robert Everett.
Inventor.
Stuart A. Brown.
By James L. Norris.
Att'y.

No. 722,173. PATENTED MAR. 3, 1903.
S. A. BROWN.
WEIGHING AND COMPUTING SCALE.
APPLICATION FILED MAR. 6, 1902.
NO MODEL. 5 SHEETS—SHEET 3.
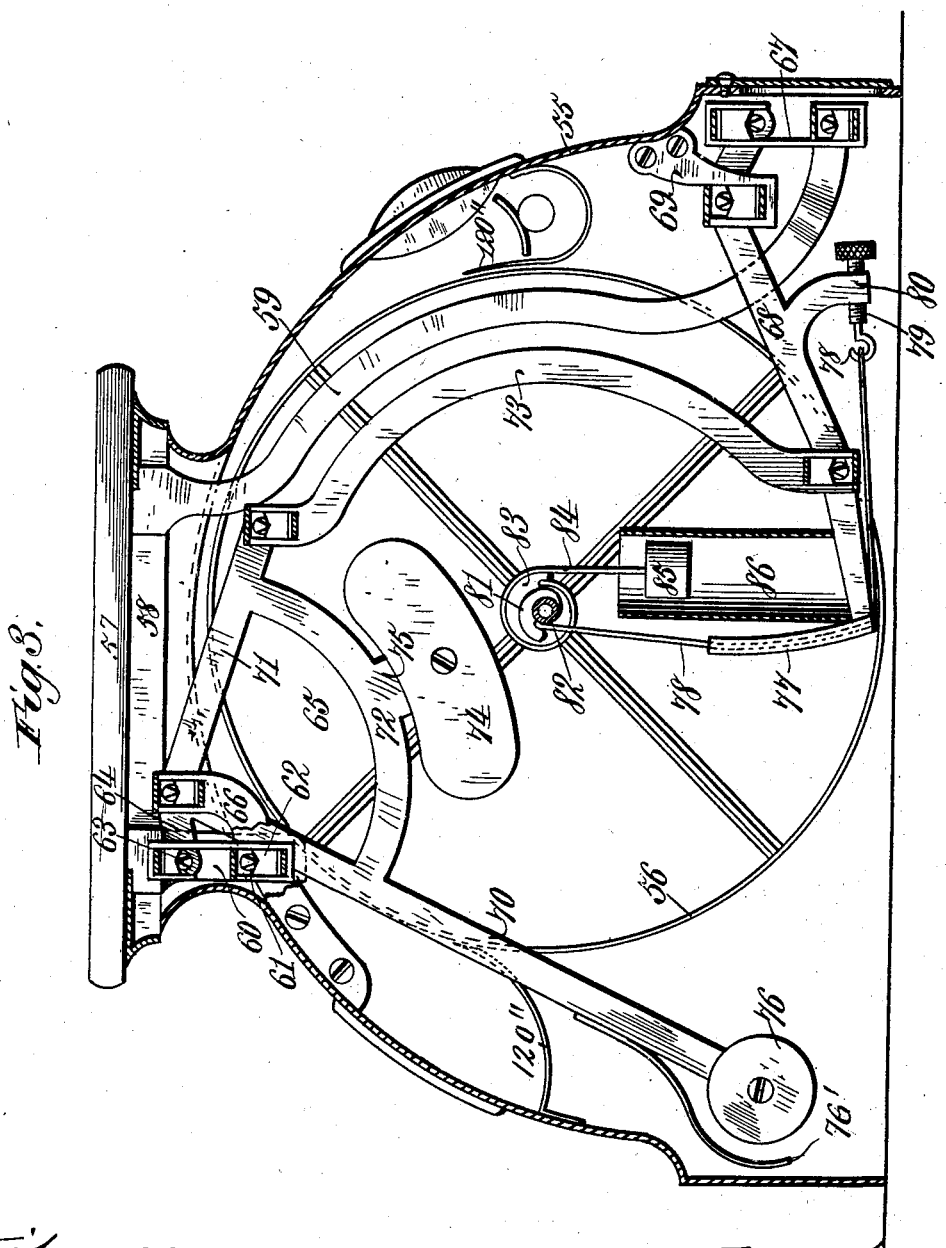
Witnesses.
Robert Everett,
T. B. Keefe
Inventor.
Stuart A. Brown,
By James L. Norris.
Atty.

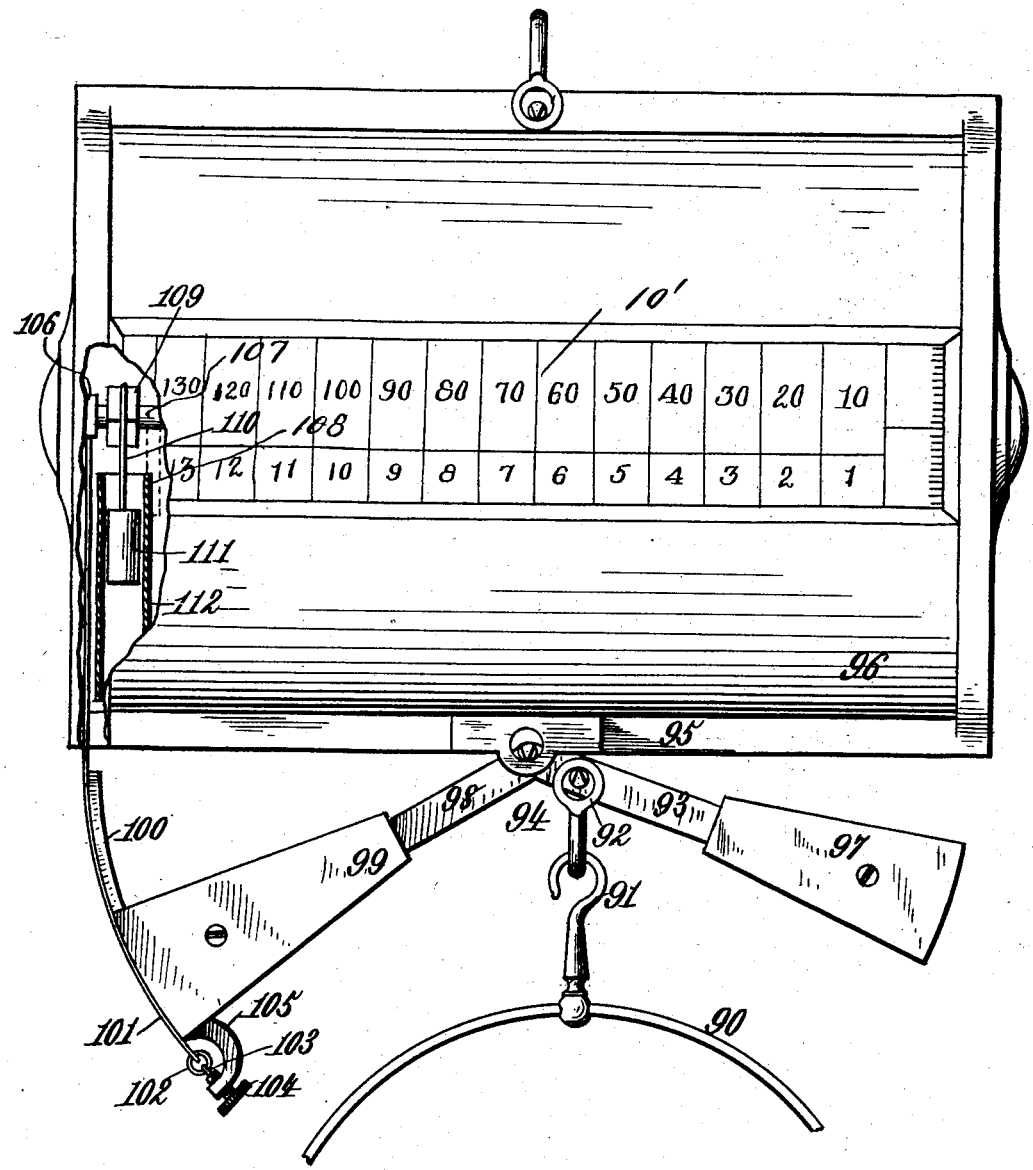

No. 722,173. PATENTED MAR. 3, 1903.
S. A. BROWN.
WEIGHING AND COMPUTING SCALE.
APPLICATION FILED MAR. 6, 1902.
NO MODEL. 5 SHEETS—SHEET 5.
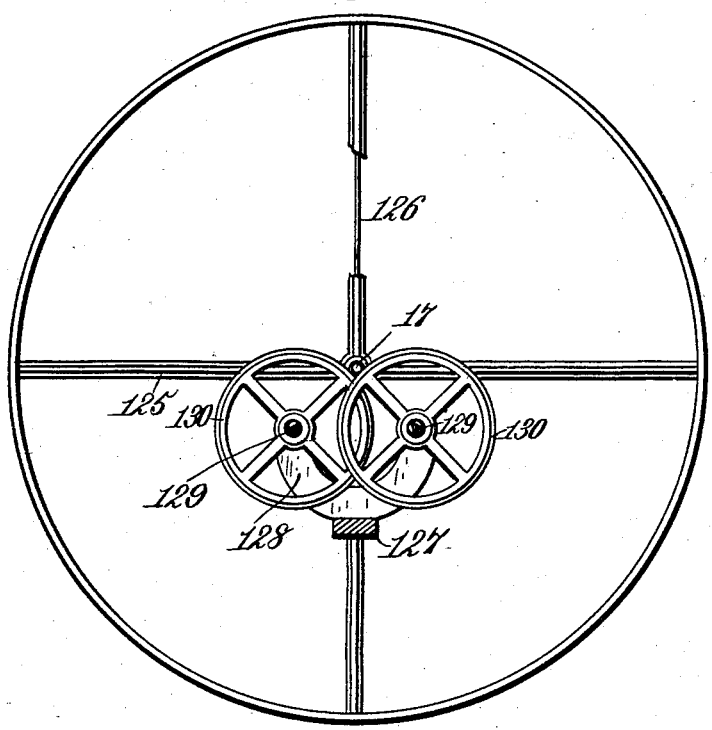
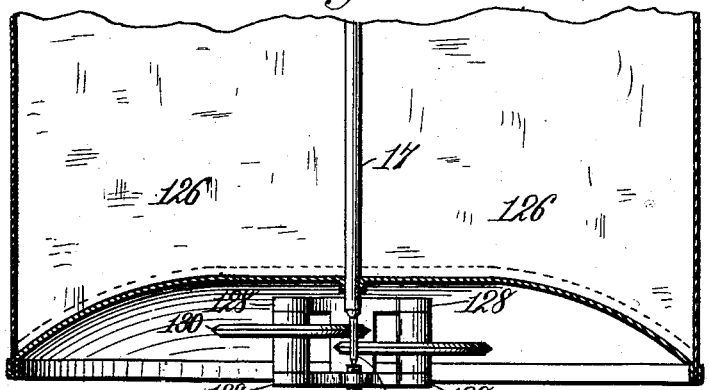
Witnesses
Inventor
Stuart A. Brown,
By James L. Norris
Att'y

UNITED STATES PATENT OFFICE.

STUART A. BROWN, OF MOUNT FAIR, VIRGINIA, ASSIGNOR OF ONE-HALF TO JOHN W. POINTS, OF WASHINGTON, DISTRICT OF COLUMBIA.

WEIGHING AND COMPUTING SCALE.

SPECIFICATION forming part of Letters Patent No. 722,173, dated March 3, 1903.

Application filed March 6, 1902. Serial No. 96,949. (No model.)

*To all whom it may concern:*

Be it known that I, STUART A. BROWN, a citizen of the United States, residing at Mount Fair, in the county of Albemarle and State of Virginia, have invented new and useful Improvements in Weighing and Computing Scales, of which the following is a specification.

This invention relates to weighing and computing scales; but it will be obvious from the following description that certain of the features can be incorporated with advantage in scales of other types.

My improved scale includes as one of its essential features the following elements in combination, to wit: an indicating device, a load-carrier and actuator coöperative with said indicating device for positively operating the same, an oscillating lever or pendulum having weights at opposite sides of its center of movement, means coöperating with said oscillatory lever for controlling said actuator and connections between the load-carrier and oscillating lever, and these several parts may be of any suitable character. The indicating device or chart in the present instance is rotary, and, as usual in this class of devices, it is provided upon its exposed surface with graduations to indicate the weight and price computations of an article placed upon said load-carrier. The actuator for the indicating device consists, preferably, of a weight which has a rising-and-falling movement and is operatively connected, for example, by a flexible connection with said indicating device, and it serves as it descends to either impart an advancing or return movement to the indicating device, its degree of movement equaling that of the platform and being controlled by the oscillating lever, which is in the nature of a duplex pendulum.

The invention includes other advantageous features which will be set forth in detail in the following description, and the novel features of said invention will be embraced by the claims following such description.

It will be understood that the invention is in no wise limited to the disclosure made by the accompanying drawings, forming a part of this specification, for many changes may be adopted within the scope of the said claims.

Referring now to the drawings, Figure 1 is a sectional side elevation of a weighing and computing scale including my improvements. Fig. 2 is a sectional end elevation of said scale, but with the indicating mechanism slightly modified, as will hereinafter appear. Fig. 3 is a transverse sectional elevation of a modified form of the same. Fig. 4 is a sectional front elevation of a further modification. Fig. 5 is a sectional end view of a chart and the means for supporting the same at one end thereof. Fig. 6 is a sectional plan view of the same. Fig. 7 is a detail in sectional elevation, showing more especially a knife-edge guard. Fig. 8 is a perspective view of said guard. Fig. 9 is a plan view of the scale-beam shown in Figs. 1 and 2.

Like characters refer to like parts in all the figures of the drawings.

Referring now to Figs. 1 and 2, the numeral 10 indicates a casing for housing the working parts of the scale, and it has interiorly thereof a base or bed 11, adapted to rest upon a counter or like support, said base being suitably connected to the casing. The load-carrier is denoted by 12, and its supporting mechanism includes a beam 13, which is shown as being of U shape, what is represented as the right ends of the branches or legs of the U having knife-edges 14, sustained by V-shaped bearings at the upper ends of the uprights or supports 15, suitably mounted inside the casing. The indicating device is designated by 16, and it is shown as consisting of a two-part cylinder or chart, the ends of which are separated or spaced from the end walls of the casing 10, while the ends of the sections of said two-part cylinder are also separated or spaced, certain parts hereinafter more particularly described operating in the spaces. The shaft or spindle 17 of the rotary indicating device 16 is sustained by suitable means, one advantageous form of which will be hereinafter described. The casing 10 is provided with the usual sight-openings 10', through which the graduated surface of the rotary price-indicating device or chart 16 can be inspected for the purpose of determining the weight, price-computations, &c., of an article or goods placed upon the load-carrier. The load-carrier has at or near its opposite ends, on the under side thereof and suitably secured in place, the cross-bars 18, and from each cross-bar arms, as 19 and 20, depend, there being a pair of arms depending from each end of the platform, and the inner arms 19 are disposed for a part of their length between the sections of the rotary indicating device 16. The outer arms 20 have knife-edges 21 at their lower ends, sustained by coöperating V-bearings fitted in notches at the lower ends of links 22, said links having similar notches at their upper ends to receive corresponding V-bearings which coact with the knife-edges 23, projecting oppositely from the branches or legs of the U-shaped beam 13. It will be understood that there are two of the links 22, they being shown as situated upon the outer sides of the branches of the beam 13, near the right or fulcrum end thereof. The arms 19 carry knife-edges 23 at their lower ends, adapted to coöperate with V-bearings carried in notches at the lower end of links 24, the upper ends of said links being correspondingly notched to receive similar bearings with which the knife-edges 25 coact, said knife-edges extending oppositely from the branches or arms 26 of the duplex lever or pendulum, designated in a general way by 28. Said pendulum 28 has a central or substantially central body or shaft 29, which extends entirely across the machine and which, it will be seen, passes between the sections of the two-part indicating-cylinder 16, said shaft or body 29 at its ends being provided with knife-edges 30, supported by V-bearings fitted in notches at the upper ends of the posts or pillars 31, rising from the base or bed 11. The uprights 15 and said pillars or posts 31 may be rigidly connected in any convenient manner with the base or bed or they may be formed integral, if desired. The pendulum or lever, it will be remembered, comprises similar branches or arms 26, which are situated in parallelism and which project angularly with respect to a horizontal line from the hub or shaft 29, similar arms or branches 32 projecting in a different and also angular direction relative to said line from said shaft or body and being also in parallelism. The lever 28, it will be understood, is oscillatory and has two branches or arms located at opposite sides of its center of movement, although it is understood that one branch in each case might be dispensed with. The branches 26 carry poise-weights 34, adjustable thereon and held in a fixed position by set-screws 35, while the other branches, 32, carry weights 36, slidable thereon and held in adjustable position by means of set-screws 37. Although there are two weights in each case, it will be understood they present the effect of a single weight, and they are located at opposite sides of the duplex pendulum or oscillatory lever 28. The branches of the U-shaped beam are provided between the knife-edges 23 and the fulcrum of said beam with knife-edges 38, the coöperating V-bearings of which are fitted in notches in the lower end of the links 39, the upper ends of the links being notched to receive V-bearings against which the knife-edges 40 upon the branches 26 of the duplex lever or pendulum 28 bear. When an article of merchandise is placed upon the platform, the same will be lowered, thereby moving the arms 19 and 20 in a corresponding direction, and the arms will serve to pull down the beam 13, whereby it can put the actuator hereinafter more particularly described and pivotally connected therewith into position for rotating the indicating device. What is shown as the branches 26, carrying the weights 36, are through the links 39 drawn downward. This operation is also followed out by the arms 19, acting through the links 24, and it will be understood that the arms 32 of the lever 28 are raised, so as to move the weight or weights 36 from the position indicated in Fig. 1 toward a horizontal line, so that the moment of said weight will increase, to thereby counterbalance anything that may have been placed upon the platform. The weight or weights 34 on the descent of the platform or load-carrier 12 have a descending movement, while the weight or weights 36 during such action have an ascending movement. The ascending weight or weights serve to counterbalance the load, the load-carrier, and the descending weight, while by reason of the descending weight or weights the counterbalancing effect of the duplex pendulum is materially increased. The decreasing leverage of the load-carrier as it descends again increases the counterbalancing effect of the ascending weight. The duplex pendulum has therefore identically the same effect as a single pendulum with a single weight as heavy as the weights 36 and 34 combined in the duplex pendulum when the pivotal connections are the same, and the following advantages are present: The oscillatory or seesaw motion is very much reduced, the pendulum being brought quickly to rest after the removal of a weight from the platform or load-carrier 12, which is so essential in a scale of the present character, and its more direct ascending and descending motion makes the scale more sensitive and accurate and with a longer-lived accuracy, due more to the direct ascent and descent and the retarded vibration by the seesaw motion. Consequently there is less wear and tear on the knife-edge pivots. High capacity is also secured with slight turn on the knife-edge bearings and without increasing the height of the scale, the slight turn having two points of merit—namely, the pendulum quickly comes to rest on account of the restricted momentum or inertia and the slight turn and said restricted momentum greatly lessens the wear and tear on the knife-edge pivots.

I provide means for positively actuating the indicator 16 and will now describe the same.

A tube 45 is shown within the casing 10, it being vertically disposed and suitably secured to the base 11 and it inclosing a rising and falling weight 46, to which the cord or similar connection 47 is attached, the cord extending upward from the top of the weight and being wound several times around the drum or cylinder 47', suitably fixed to what is shown of the left end of the shaft 17. The cord 47 after it leaves the drum extends downward and is in contact with the curved face of a segment 48, suitably secured to the outer face of the transverse portion of the U-shaped beam 13, substantially centrally thereof, and the lower end of the cord is passed through a perforation in the free end of a spring-arm 49' and provided on its lower end with a stop 50. The spring-arm 49' is somewhat long, and it is attached at one end to the lower end of the transverse portion of the beam 13. Said transverse portion has in proximity to the segment 48 a screw 51, tapped into a boss of said transverse portion, and the lower end of the screw is adapted to engage the spring-arm 49' near the free end of the latter, so that by running the screw the spring-arm will be lowered for the purpose of securing a forward movement of the indicating device 16, or by elevating the screw the spring-arm will follow the same, so as to secure a rearward movement of the said indicating device, this being for the purpose of centering the same for the purpose of securing precision in weighing.

As the beam 13 is lowered in the manner previously described it pulls down the inner portion of the cord 47, and as the curved face of the segment 48 is in contact with said inner portion the latter is kept straight, and simultaneously the weight 46 is elevated, and consequently the drum 47', and hence the indicating device 16 is rotated, the degree of rotation of said rotating device corresponding with that of the beam 13. When the article is taken from the platform 12, the weight or weights 36 can return to their initial positions, thereby permitting the weight 46 to fall, said weight 46, through the cord 47, serving to reversely rotate the drum or cylinder 47' and similarly operate the indicating device.

During the ascent and descent of the weight 46 the tube 45 serves as a convenient guide therefor, being adapted to prevent undue swaying motion of said weight.

Referring now to Fig. 3, showing a different form of mechanism, in which construction the actuator serves to impart a forward movement to the indicating device, the casing for housing the different parts is denoted by 55 and the indicating device inclosed therein by 56, said indicating device being of a construction and mounted precisely like the one hereinbefore described, so that a detailed description of same is unnecessary. The platform of the scale is designated by 57, and it has upon its under side, substantially centrally thereof, the cross-bars 58, and from which, at one end thereof, the long arm 59 depends, the opposite end having a shorter arm 60 in alinement with said arm 59, the arm 59 being situated between the sections of the indicating device 56. The arm 60 is provided at or near its lower end with knife-edges 61, sustained by a V-bearing at the lower end of the link 62, the upper end of the link having a similar V-bearing working against the knife-edge 63 upon the lug 64 of the angle-lever 65, fulcrumed at its angle upon a V-bearing carried by the support 66, suitably secured within the casing 55. The lower end of the arm 59 is connected by a link 67, connected at its upper end with one end of the beam 68, fulcrumed upon the bearing 69 in the casing 55, the link 69 and bearing just alluded to being precisely like those hereinbefore described at length. The angle-lever 65 has long and short arms 70 and 71, respectively connected by the arc-shaped portion 72. The short arm of said angle-lever is connected by a link 73 with the beam 68, exactly like the other links. A weight 74 is connected to the extension 75 of the arc-shaped portion 72, and it is the equivalent of the weight or weights 36, hereinbefore described, and although it is carried by said arc-shaped portion 72 its effect is substantially the same as though it were directly connected to the short arm 71 of the angle-lever. The long arm of the angle-lever carries a weight 76, the equivalent of the weight or weights 34, hereinbefore described. The weighted arm 76 is furnished with a spring 76', constituting a buffer and which is adapted to abut against the casing of the machine when said arm is moved through a certain distance, so as not to materially jar the parts. As the platform 57 descends with an article placed thereupon the long arm of the beam 68, through the intermediate connections, is elevated, thereby thrusting the link 73 upward, and hence moving the weight 74 upward or toward a horizontal line, so as to counterbalance the article placed upon the platform, the weight 76 during this action having a descending movement. The beam 68 carries at its inner end a segment 77, against the curved face of which the cord 78 is adapted to play, the cord extending outwardly from the lower end of the curved face of said segment and having one end connected with the hook 78, the shank of which is tapped into or otherwise secured to the screw 79, threaded into a boss at the lower end of the lug 80 upon the beam 68. The cord after it leaves the upper portion of the segment is fastened to the periphery of a pulley 81 upon the shaft 82 of the indicating device, a similar pulley 83 being also fixed to said shaft in adjacence to said pulley and having a cord 84 placed upon its periphery, the free end of the cord carrying a weight 85 situated in the tube 86. By operating the screw 79 the indicating device 56 can be centered as the indicating device 16, as hereinbefore described. As the long arm of the beam descends during the descent of the platform the weight 85 is permitted to drop, thereby imparting an advance rotary movement to the indicating device. Upon the drop of said long arm of the beam the weight 85 is lifted until the parts have been returned to their initial positions.

Referring now to Fig. 4, I have shown my improvements embodied in a pan-scale, although simply the bail 90 of the pan is shown. The said bail has at the top the upwardly-extending hook 91, adapted to engage a similar hook at the lower end of a clevis 92, sustained by knife-edge bearing upon the arm 93 of a duplex pendulum 94, fulcrumed substantially centrally upon a V-bearing carried by the frame 95 of the casing 96. The arm 93 carries a weight 97, corresponding with the weight 76 and the weight or weights 34, while the arm 98 of said duplex pendulum is provided with a weight 99, corresponding with the weight 74 and weight or weights 36, hereinbefore described, the arms 93 and 98 being of substantially similar extent. The outer face of the weight 99 is curved to agree with the curved face of a segment 100, fastened to the upper side of said weight at its outer end, and a cord 101 is adapted to engage such curved faces, its lower end having an eye 102, adapted to engage the hook 103 at the upper end of a screw 104, carried by the curved lug 105, depending from the weight 99 and mounted and operated like the screw 79, hereinbefore described. The upper end of the cord 101 is connected with a pulley 106 on the shaft 107 of the indicating device 108, a pulley 109 being arranged adjacent to the other one and being provided with a cord 110 and having at its lower end a weight 111, adapted to rise and fall in a tube 112, suitably secured in the casing 96, the pulleys 106 and 109 being the equivalents of pulleys 81 and 83, hereinbefore described. When an article is placed upon the pan of the platform, (not shown,) the hook 103 is drawn downwardly, thereby moving the arm 93 in a corresponding direction and elevating the arm 98, which carries the poise 99, which is intended to counterbalance the weight placed upon said pan, and as said weight travels toward a horizontal line it is adapted, like the other weights, to increase in efficiency, and on such motion the weight 111 can drop, thereby causing the indicating device 108 to move in a forward direction. The indicating device is returned to its primary position by the dropping of the weight 99, which occurs the instant that the weight is taken from the pan.

The frame 95 of the form of scale shown in Fig. 4 is of substantially rectangular form, it being adapted to snugly receive the cylindrical casing 96.

Referring now to Figs. 7 and 8, the numeral 115 indicates a knife-edge guard, the latter having a vertical portion 116, provided with a horizontal portion 117, adapted to fit within the notches of the links 24 39, &c., and said horizontal portion has at its opposite ends a short vertical portion 118, between which and the vertical portion 116 the V-bearings, hereinbefore described, are adapted to fit. The vertical portion 116 has at its opposite ends the horizontal portion 119, in parallelism with the horizontal portion 117, but longer than the same, and which is adapted to overhang the knife-edges, as indicated in Fig. 6, and which has a depending portion 115'. It will be seen on reference to Fig. 6, therefore, that the part 115 is in the nature of a protective hood for the knife-edge and its bearing, it serving to prevent the entrance of dust, dirt, or other foreign matter to said parts. The horizontal portion 117 is of reduced width, while a part of the horizontal portion 119 in vertical line therewith is similarly constructed, these reduced portions fitting within the pockets of the links, so as to hold the guards 115 firmly in place.

The scale shown in Fig. 2 has suitably secured within the casing dished plates 120', which have sight-openings like the sight-openings 10', hereinbefore described, and through which the figures upon the two-part cylinder 16 can be read, and the casing of said scale opposite such plates is slotted to receive lenses or magnifying-glasses, as 121, fastened in place in some convenient manner and by which the figures on the chart or cylinder are magnified. In the scale shown in Fig. 3 the same magnifying-glasses are retained, but the plates (denoted by 120'') are of slightly-different form. The upper edges of such plates 120'' are horizontal and constitute straight edges, as they facilitate the reading of the cylinder. A reflector, concaved, as 122, coöperates with one of these lenses, it being tiltably supported by suitable bearings in proximity to the lenses within the casing and having a thumb-piece 123 by which said reflector can be manipulated so as to throw the magnified rays of light onto the surface of the indicating device.

Referring now to Figs. 5 and 6, the shaft or spindle 17 of the rotary indicating device 16 carries spiders 125, the arms of which are suitably connected with said indicating device and are grooved upon their inner faces to receive the fan-blades 126, said blades serving as a governor to prevent undue oscillation of the indicating device. The bearings for carrying the opposite ends of the spindle 17 are of peculiar form, and I have shown in said Figs. 5 and 6 one of the bearings, it being understood that the other is a duplicate of that illustrated, and I will now proceed to describe in detail such novel form of bearing.

A bracket 127 is suitably secured inside the casing of the machine, and it is provided with the the arms 128, (see Fig. 6,) connected at their upper ends by the knife-edges 129, which knife-edges extend through the hubs of the wheels 130 and constitute a support upon which said wheels can turn, the result being that a very small amount of friction is present between the contacting parts. One of the wheels overlaps the other, and on reference to Fig. 6 it will be seen that the peripheries of said wheels are of knife-edge form. The spindle 17 is reduced at its ends, as shown at 131, the reduced end being pointed to fit into the tapering socket of the screws 132 (only one of which is seen, which is tapped into the bearing 133 of the bracket 127.) The two screws 132 serve to prevent undue endwise movement of the price-indicating device. The reduced portion 131 of the spindle 17 is supported by the knife-edge peripheries of the overlapping wheels 130, the wheels being so related that their peripheries form a pocket, into which the reduced portion 131 is set. It will be understood that the price-indicating device is supported by the knife-edge wheels 130 and that the latter in turn are sustained by knife-edges, so that a bearing is provided where the friction is reduced to the least possible extent, which is a very important item when accurate weighing is to be secured.

Referring now to Fig. 2, the rate-numbers are not put upon the casing of the scale shown in said figure, as is the case with the scale shown in Fig. 1, but are marked upon the outer or exposed face of the plate 120', from which they may be read through the adjacent magnifying-glass 121, it being understood, of course, that said plate 120' has a slot through which the figures on the cylinder 16 can be seen.

Having described my invention, what I claim is—

1. In a scale, an indicating device, a load-carrier, an actuator for said indicating device, an oscillatory lever having weights at opposite sides of its center of movement, means coöperative with said oscillatory lever for controlling said actuator, including a beam, connection between the beam and the load-carrier, and connections between the load-carrier and oscillatory lever.

2. In a scale, a rotary indicating device, a load-carrier, a weight operatively connected with said indicating device for positively actuating the same, an oscillatory lever having weights at opposite sides of its center of movement, means coöperative with said oscillatory lever for controlling the ascent and descent of said first-mentioned weight, including a beam, connection between the beam and the load-carrier and connections between the load-carrier and the oscillatory lever.

3. In a scale, an indicating device, a load-carrier, an actuator for positively operating said indicating device, an oscillating lever connected with the load-carrier and having weights at opposite sides of its center of movement, a beam operatively connected with said oscillatory lever, connections between the load-carrier and the beam, and mechanism between said beam and actuator for controlling the latter.

4. In a scale, an indicating device, a load-carrier, an actuator for positively operating said indicating device, a beam, connections between the beam and the load-carrier, an oscillating lever connected with the load-carrier and having weights at opposite sides of its center of movement, connections between the beam and one arm of the oscillatory lever, a segment carried by the beam, and a cord adapted to traverse the curved face of the segment and connected with said beam, said cord being coöperative with the price-indicator and being connected with said actuator.

5. In a scale, an indicating device, a load-carrier, an actuator for positively operating said indicating device, a beam, connections between the beam and the load-carrier, an oscillating lever connected with the load-carrier and having weights at opposite sides of its center of movement, connections between the beam and one arm of the oscillatory lever, a segment carried by the beam, a cord adapted to traverse the curved face of the segment and connected with said beam, said cord being coöperative with the price-indicator and being connected with said actuator, and a tube adapted to receive said actuator for the purpose of guiding the same.

6. In a scale, a rotary indicating device, the shaft of which carries a drum, a cord wound on said drum and having a weight, a beam also connected with said cord, a load-carrier, connections between the load-carrier and the beam, and an oscillating lever connected with the load-carrier and having weights at opposite sides of its center of movement and operatively connected with said beam.

7. In a scale, an indicating device, an actuator for said indicating device, a load-carrier, a counterbalancing-pendulum, a beam, pivotal connections between the load-carrier and the pendulum on one side of the axis of the latter, pivotal connections between the beam and the pendulum on one side of the axis of said beam, pivotal connections between the load-carrier and the beam on the same side of the axis of the beam as said last-mentioned pivotal connections and means coöperative with said pendulum for controlling said actuator.

8. In a scale, a rotary indicating device having a shaft, wheels having knife-edge peripheries for sustaining said shaft, knife-edge pivots for carrying said wheels, an actuator for the indicating device, a load-carrier, a beam, a duplex pendulum having weights on the opposite sides of its axis of movement, pivotal connections between the load-carrier and the pendulum, between the pendulum and the beam and between the beam and the load-carrier and means coöperative with said pendulum for controlling said actuator.

9. In a scale, a load-carrier, and counterbalancing means for the load-carrier including an oscillatory lever, having weights at opposite sides of its center of oscillation and connected with said load-carrier, combined with an indicating device and means supported independently of and controlled by said oscillatory lever, for positively operating said indicating device.

10. In a scale, a load-carrier, and counterbalancing means for the load-carrier, including an oscillatory lever having weights at opposite sides of its center of oscillation and connected with the load-carrier, combined with an indicating device, a weight flexibly connected with said indicating device and adapted to positively operate said indicating device, and means coöperative with said oscillatory lever for controlling said weight.

In testimony whereof I have hereunto set my hand in presence of two subscribing witnesses.

STUART A. BROWN.

Witnesses:
E. T. CHAPMAN,
J. TYLER JACKSON.